US011459272B2

(12) United States Patent
Geng et al.

(10) Patent No.: US 11,459,272 B2
(45) Date of Patent: Oct. 4, 2022

(54) METHOD FOR PREPARING IRON ALLOY AND CEMENT MATERIAL

(71) Applicant: TSINGHUA UNIVERSITY, Beijing (CN)

(72) Inventors: Chao Geng, Beijing (CN); Jianguo Liu, Beijing (CN); Shichao Wu, Beijing (CN); Shuyao Yu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 571 days.

(21) Appl. No.: 16/492,586

(22) PCT Filed: Nov. 16, 2018

(86) PCT No.: PCT/CN2018/115888
§ 371 (c)(1),
(2) Date: Sep. 9, 2019

(87) PCT Pub. No.: WO2020/073427
PCT Pub. Date: Apr. 16, 2020

(65) Prior Publication Data
US 2020/0223752 A1 Jul. 16, 2020

(30) Foreign Application Priority Data
Oct. 11, 2018 (CN) .......................... 201811183954.5

(51) Int. Cl.
*C04B 7/24* (2006.01)
*B03C 1/02* (2006.01)
(Continued)

(52) U.S. Cl.
CPC ................ *C04B 7/243* (2013.01); *B03C 1/02* (2013.01); *B09B 3/40* (2022.01); *C22B 1/02* (2013.01);
(Continued)

(58) Field of Classification Search
CPC ....... C04B 7/243; B09B 3/40; B09B 2101/30; B03C 1/02; B03C 2201/20; C22B 1/02
(Continued)

(56) References Cited

U.S. PATENT DOCUMENTS 4,045,537 A 8/1977 Hrishikesan
2020/0223752 A1* 7/2020 Geng ........................ B09B 3/00

FOREIGN PATENT DOCUMENTS

CN 101275182 A 10/2008
CN 102491363 A * 6/2012
(Continued)

OTHER PUBLICATIONS

International Search Report from corresponding PCT Application No. PCT/CN2018/115888.

*Primary Examiner* — Terrell H Matthews
(74) *Attorney, Agent, or Firm* — Innovation Capital Law Group, LLP; Vic Lin

(57) ABSTRACT

A method for preparing iron alloy and a cement material, in the field of solid waste recycling, provides an efficient, synergistic effect between main components of carbon, calcium and heavy metal in municipal solid waste incineration (MSWI) fly ash and main components of iron, aluminum and silicon in red mud, so that the iron alloy and cement material can be readily obtained. By using waste to treat waste and using the complementarity of the components of two waste streams, carbon in the MSWI fly ash may provide a reductant to accelerate an iron mineral in the red mud to reduce into metal iron. With the formation of the metal iron, a siderophile heavy metal element in the MSWI fly ash is also accelerated to enter an iron phase. Meanwhile, the cement material is formed by $Al_2O_3$ and $SiO_2$ in the red mud and CaO in the MSWI fly ash.

15 Claims, 1 Drawing Sheet

(51) Int. Cl.
*C22B 1/02* (2006.01)
*B09B 3/40* (2022.01)
*B09B 101/30* (2022.01)

(52) U.S. Cl.
CPC ....... *B03C 2201/20* (2013.01); *B09B 2101/30* (2022.01)

(58) Field of Classification Search
USPC .......................................................... 106/641
See application file for complete search history.

(56) References Cited

FOREIGN PATENT DOCUMENTS

| | | | | | |
|---|---|---|---|---|---|
| CN | 102424391 B | * | 8/2013 | | |
| CN | 107963902 A | * | 4/2018 | | |
| CN | 108118141 A | * | 6/2018 | | |
| CN | 108118141 A | | 6/2018 | | |
| CN | 109265029 A | * | 1/2019 | ............... | B03C 1/02 |
| CN | 111960701 B | * | 7/2021 | ............... | B03C 1/02 |

\* cited by examiner

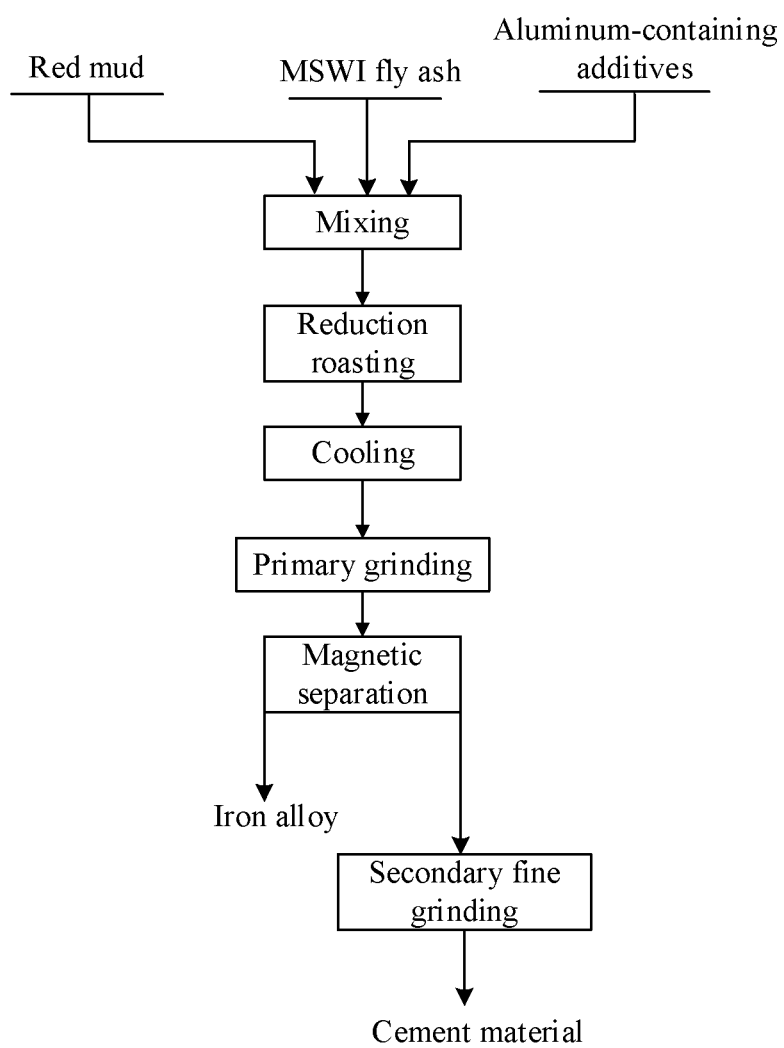

METHOD FOR PREPARING IRON ALLOY AND CEMENT MATERIAL

The present application claims priority to the Chinese Patent Application No. CN201811183954.5, filed with the Chinese Patent Office on Oct. 11, 2018, and entitled "METHOD FOR PREPARING IRON ALLOY AND CEMENT MATERIAL", which is incorporated herein by reference in its entirety.

TECHNICAL FIELD

The present invention relates to the technical field of solid waste recycling, and in particular to a method for preparing iron alloy and a cement material.

BACKGROUND

In recent years, the municipal solid waste incineration (MSWI) technology in China has been developed rapidly. By the end of 2016, nearly 300 MSWI plants had been established throughout the country, the daily treatment capacity was close to 300,000 tons, and a proportion in a total amount of harmless treatment of municipal solid waste (MSW) in China had been beyond 32%. A great deal of fly ash is produced in a flue gas purification process of MSWI. It is estimated according to a MSWI capacity that the output of the fly ash in 2020 will reach to about 10 million tons. Due to the enrichment of a heavy metal and dioxins substance, and a complex characteristic, the MSWI fly ash is a hazardous waste listed into Directory of National Hazardous Wastes and needs to be managed specially. However, a harmless disposal rate of the fly ash in China at present is relatively low, which is a weak link of our country in MSWI pollutant control and hazardous waste environmental management. Based on a basic property of the fly ash, it is considered that high-temperature melting is an ideal process with obvious volume reduction and thoroughly harmless treatment. While, heavy metals are concentrated in large amounts in FA, and melting disposal wastes these valuable metals. Recycling of these metals will alleviate the shortages of metal resources. Therefore, conversion of MSWI fly ash into a secondary resource and the development of new technologies to meet the specific demands of treatment have gained significant interest.

Red mud is discharged as hazardous waste during the production of alumina from bauxite. Since the grade of bauxite in recent years is reduced, the output of the red mud is increased year by year. Till now, the accumulative piling amount of the red mud in China has been reached to 300 million tons or more. Except for a little amount of the red mud applied to cement production, brick making and the like, most of the red mud is piled in an open dam. At present, a hazard of the red mud piling to an environment is increasingly concerned by people. For example, the piling of the red mud occupies a lot of lands, and consumes large cost for storage yard construction and maintenance; and moreover, a harmful substance in the red mud is penetrated into the underground to pollute underground water and soil. The dust formed by the exposed red mud flies with the wind to pollute an atmosphere, which causes a negative effect to survival of human beings, animals and plants and deteriorates an ecological environment. Along with the ever-increasing output of the red mud and continuous improvement of an environmental protection awareness of the people, it is urgent to limit the hazard of the red mud to the utmost extent, and utilize and improve the red mud in multiple ways. In the existing red mud treatment method, coal-based reduction has been demonstrated to be efficient to recover iron from red mud. While the tailing obtained by coal-based reduction is still the solid waste, the recycling of the red mud cannot be implemented.

SUMMARY

An objective of the present invention is to provide a method for preparing iron alloy and a cement material. According to the present invention, municipal solid waste incineration (MSWI) fly ash and red mud are taken as raw materials to prepare the iron alloy and the cement material, thus implementing recycling of the MSWI fly ash and the red mud.

The present invention provides a method for preparing iron alloy and a cement material, including the following steps:

subjecting a mixture obtained by mixing MSWI fly ash with red mud to reduction roasting to obtain a roasted product; and subjecting the roasted product to grinding-magnetic separation to obtain the iron alloy and the cement material.

Preferably, the mass percentage of the MSWI fly ash in the mixture is 30-70%, and the mass percentage of the red mud is 30-70%.

Preferably, the mixture further includes an aluminum-containing additive, and the mass percentage of the aluminum-containing additive in the mixture is 0-30%.

Preferably, the aluminum-containing additive includes one or more of aluminum oxide, aluminum powder, aluminum slag and aluminum ash.

Preferably, the MSWI fly ash includes the following components by mass percentage: 10-70% of CaO, 5-20% of C, 0.1-10% of $SiO_2$, 0.1-10% of $Al_2O_3$, 0.1-30% of Cl, 0.1-10% of $Na_2O$, 0.1-10% of $K_2O$, 0.1-10% of MgO, 0.1-10% of $SO_3$, 0.1-10% of $Fe_2O_3$, 0-10% of $TiO_2$ and 0-10% of $P_2O_5$.

Preferably, the MSWI fly ash further includes the following components by mass percentage: 0-1% of ZnO, 0-1% of PbO, 0-1% of $Cr_2O_3$, 0-1% of CuO, 0-1% of MnO, 0-1% of NiO, 0-1% of BaO, 0-1% of SrO, 0-1% of CdO and 0-1% of Hg.

Preferably, the red mud includes the following components by mass percentage: 30-50% of $Fe_2O_3$, 10-30% of $Al_2O_3$, 15-50% of $SiO_2$, 0.1-10% of CaO, 0.1-5% of MgO, 1-10% of $Na_2O$, 0.1-0.5% of $K_2O$, and 0.5-10% of $TiO_2$; and the ignition loss is 1-15%. Preferably, the temperature for the reduction roasting is 1100-1350° C., and the time for the reduction roasting is 30-90 min.

Preferably, the grinding-magnetic separation includes primary grinding, magnetic separation and secondary fine grinding that are carried out sequentially; and the mass fraction having a fineness of −0.043 mm in the primary grinding product is 50-80%; the mass fraction having the fineness of −0.043 mm is 90-100% and the specific surface area is 350-600 m²/kg in the secondary fine grinding product.

Preferably, the magnetic field intensity in the magnetic separation is 1.8-2.0 kGs.

The present invention provides a method for preparing iron alloy and a cement material, which includes the following steps: subjecting a mixture obtained by mixing MSWI fly ash with red mud to reduction roasting to obtain a roasted product; and subjecting the roasted product to grinding-magnetic separation to obtain the iron alloy and the cement material. According to the present invention, an synergistic effect between the main components of carbon, calcium and heavy metal in the MSWI fly ash and the main components of iron, aluminum and silicon in the red mud is utilized efficiently, so that the iron alloy and cement material can be obtained at last. By using waste to treat waste and using the complementarity of two wastes in components, carbon in the MSWI fly ash may provide a reductant for the reduction roasting to accelerate an iron mineral in the red mud to reduce into metal iron. With the formation of the metal iron, a siderophile heavy metal element in the MSWI fly ash is also accelerated to enter an iron phase, so that the iron alloy can be obtained. Meanwhile, the cement material is formed by $Al_2O_3$ and $SiO_2$ in the red mud and CaO in the MSWI fly ash. Therefore, the MSWI fly ash and the red mud that are two important hazardous wastes to be treated urgently in China are recycled and are comprehensively utilized. In addition, an iron alloy product obtained by the present invention has a higher price than iron ore concentrate; and because of a trace amount of Ni, Cu, Cr and other elements contained therein, the value is higher compared with an iron product of coal-based reduction. The obtained cement material may be used for producing cement, so that the production cost is lower and a great number of natural stone materials are saved. The recycling of the two solid wastes via the present invention, improves the comprehensive utilization rate of resources, helps to construct a resource-conserving society, and can implement a higher economic value.

Furthermore, compared with the existing technology of MSWI fly ash melting, the present invention not only can implement the quantity reduction and harmless disposal of the fly ash, but also implement the recycling of the fly ash. Compared with the MSWI fly ash melting process, the temperature is lower; the MSWI fly ash melting temperature is more than 1400° C., and the reaction temperature for the reduction roasting in the present invention is less than 1350° C., so that the energy consumption is saved. Compared with the existing technology of coal-based reduction for red mud, the present invention avoids the consumption of coke and coal which have a relatively high cost. Thus, the production cost and the environmental pollution in a coking process are reduced. Compared with the coal-based reduction process, the present invention not only implements the recovery of the iron in the red mud, but also utilizes other components in the red mud. According to the data of embodiments, an iron alloy with the iron grade of 91.96-93.73%, the iron recovery rate of 83.22-85.94% can be obtained by the present invention. Meanwhile, a cement material with the specific surface area of 480-550 $m^2/kg$, the main phases of glass phase and tricalcium silicate, and 28-day compressive strength of 78-86 Mpa can be obtained by the present invention.

BRIEF DESCRIPTION OF THE DRAWINGS

FIG. 1 is a flowchart of a method for preparing iron alloy and cement material according to the present invention.

DETAILED DESCRIPTION

The present invention provides a method for preparing iron alloy and a cement material, which includes the following steps:

subject a mixture obtained by mixing MSWI fly ash with red mud to reduction roasting to obtain a roasted product; and subject the roasted product to grinding-magnetic separation to obtain the iron alloy and the cement material.

In the present invention, a mixture obtained by mixing MSWI fly ash with red mud is subjected to reduction roasting to obtain a roasted product. In the present invention, the mass percentage of the MSWI fly ash in the mixture is preferably 30-70%, more preferably 34-38% and most preferably 35%; and the mass percentage of the red mud is preferably 30-70%, and more preferably 48-50%.

In the present invention, the mixture preferably further includes an aluminum-containing additive; and the mass percentage of the aluminum-containing additive in the mixture is preferably 0-30%, more preferably 14-16%, and most preferably 15%.

In the present invention, the aluminum-containing additive preferably includes one or more of aluminum oxide, aluminum powder, aluminum slag and aluminum ash. When the aluminum-containing additive is a mixture preferably, a proportion of each component in the mixture is not specially defined by the present invention and the mixture using any proportion is acceptable. In the present invention, whether to add the aluminum-containing additive is determined according to the aluminum content in the red mud. When the aluminum content in the red mud is 25-30%, the aluminum-containing additive is added to induce to generate calcium aluminate to produce a calcium aluminate cement material. When the aluminum content in the red mud is 10-25%, the aluminum-containing additive is not added to produce a cement material with main phase of glass phase and tricalcium silicate.

In the present invention, the MSWI fly ash preferably includes the following components by mass percentage: 10-70% of CaO, 5-20% of C, 0.1-10% of $SiO_2$, 0.1-10% of $Al_2O_3$, 0.1-30% of Cl, 0.1-10% of $Na_2O$, 0.1-10% of $K_2O$, 0.1-10% of MgO, 0.1-10% of $SO_3$, 0.1-10% of $Fe_2O_3$, 0-10% of $TiO_2$ and 0-10% of $P_2O_5$, more preferably 40.11-43.76% of CaO, 11.2-15.87% of C, 4.53-6.60% of $SiO_2$, 1.21-1.68% of $Al_2O_3$, 15.87-19.61% of Cl, 2.12-3.18% of $Na_2O$, 4.32-5.17% of $K_2O$, 1.68-2.87% of MgO, 2.86-4.79% of $SO_3$, 2.08-4.08% of $Fe_2O_3$, 0.38-0.43% of $TiO_2$ and 0.35-0.39% of $P_2O_5$, and most preferably 42.26% of CaO, 14.13% of C, 5.31% of $SiO_2$, 1.43% of $Al_2O_3$, 18.91% of Cl, 2.90% of $Na_2O$, 4.34% of $K_2O$, 2.37% of MgO, 3.78% of $SO_3$, 2.89% of $Fe_2O_3$, 0.40% of $TiO_2$ and 0.36% of $P_2O_5$.

In the present invention, the MSWI fly ash preferably further includes the following components by mass percentage: 0-1% of ZnO, 0-1% of PbO, 0-1% of $Cr_2O_3$, 0-1% of CuO, 0-1% of MnO, 0-1% of NiO, 0-1% of BaO, 0-1% of SrO, 0-1% of CdO and 0-1% of Hg, more preferably 0.52-0.85% of ZnO, 0.16-0.17% of PbO, 0.04-0.12% of $Cr_2O_3$, 0.05-0.08% of CuO, 0.07-0.11% of MnO, 0.02-0.07% of NiO, 0.02-0.03% of SrO and 0.001% of Hg, and most preferably 0.58% of ZnO, 0.08% of MnO and 0.06% of NiO.

In the present invention, the red mud preferably includes the following components by mass percentage: 30-50% of $Fe_2O_3$, 10-30% of $Al_2O_3$, 15-50% of $SiO_2$, 0.1-10% of CaO, 0.1-5% of MgO, 1-10% of $Na_2O$, 0.1-0.5% of $K_2O$ and 0.5-10% of $TiO_2$, more preferably 36.86-42.31% of $Fe_2O_3$, 20.33-26.43% of $Al_2O_3$, 18.50-19.21% of $SiO_2$, 1.79-2.92% of CaO, 0.24-0.44% of MgO, 7.69-9.33% of $Na_2O$, 0.10-0.37% of $K_2O$ and 2.01-4.51% of $TiO_2$, and most preferably 42.31% of $Fe_2O_3$, 20.33% of $Al_2O_3$, 19.21% of $SiO_2$, 2.41% of CaO, 0.23% of MgO, 8.87% of $Na_2O$, 0.19% of $K_2O$ and 2.01% of $TiO_2$.

In the present invention, the ignition loss of the red mud is preferably 1-15%, more preferably 3.14-6.18%, and most preferably 4.11%.

Sources of the MSWI fly ash and the red mud are not specially defined by the present invention, and may use a product know to a person skilled in the art.

According to the present invention, an synergistic effect between the main components of carbon, calcium and heavy metal in the MSWI fly ash and the main components of iron, aluminum and silicon in the red mud is utilized efficiently, so that the iron alloy and cement material can be obtained at last. By using waste to treat waste and using the complementarity of two wastes in components, carbon in the MSWI fly ash may provide a reductant for the reduction to accelerate an iron mineral in the red mud to reduce into metal iron. With the formation of the metal iron, a siderophile heavy metal element in the MSWI fly ash is also accelerated to enter an iron phase, so that the iron alloy can be obtained. Meanwhile, the cement material is formed by $Al_2O_3$ and $SiO_2$ in the red mud and CaO in the MSWI fly ash. Therefore, the MSWI fly ash and the red mud that are two important hazardous wastes to be treated urgently in China are recycled and are comprehensively utilized. In addition, an iron alloy product obtained by the present invention has a higher price than iron ore concentrate; and because of a trace amount of Ni, Cu, Cr and other elements contained therein, the value is higher compared with an iron product of coal-based reduction. The obtained cement material may be used for producing cement, so that the production cost is lower and a great number of natural stone materials are saved. The recycling of the two solid wastes via the present invention, improves the comprehensive utilization rate of resources, helps to construct a resource-conserving society, and can implement a higher economic value.

In the present invention, the temperature for the reduction roasting is preferably 1100-1350° C. and more preferably 1250° C.; and the time for reduction roasting is preferably 30-90 min and more preferably 60 min.

In the present invention, the reduction roasting is carried out in a muffle furnace preferably.

After the roasted product is obtained, the roasted product is cooled preferably in the present invention. A specific manner for cooling is not specially defined by the present invention. Specifically, the cooling is natural cooling or water quenching for example.

After the roasted product is obtained, the roasted product is subjected to the grinding-magnetic separation to obtain the iron alloy and the cement material in the present invention. In the present invention, the grinding-magnetic separation preferably includes primary grinding, magnetic separation and secondary fine grinding that are carried out sequentially.

The mass fraction having a fineness of −0.043 mm in an obtained primary grinding product is preferably 50-80%. For the secondary fine grinding, the mass fraction having the fineness of −0.043 mm is 90-100%, and the specific surface area is 350-600 m²/kg. In the present invention, the mass fraction having the fineness of −0.043 mm in the primary grinding product is more preferably 69.32-73.48% and most preferably 71.32%. The mass fraction having the fineness of −0.043 mm in the secondary fine grinding product is more preferably 92.14-97.36%, and the specific surface area of the secondary fine grinding product is preferably 480-571 m²/kg; and most preferably, the mass fraction is 94.58%, and the specific surface area is 550 m²/kg.

In the present invention, the magnetic field intensity in the magnetic separation is 1.8-2.0 kGs preferably.

In the present invention, the magnetic separation is carried out in a magnetic separator preferably.

In order to further describe the present invention, the method for preparing the iron alloy and the cement material provided by the present invention will be described below in detail in combination with embodiments. However, these embodiments cannot be understood as a limit to a protection scope of the present invention.

FIG. 1 is a flowchart for preparing iron alloy and a cement material according to an embodiment of the present invention: a mixture obtained by mixing MSWI fly ash with red mud is subjected to reduction roasting, where whether an aluminum-containing additive is added is determined according to raw materials; and a roasted product is cooled and then is subjected to primary grinding, magnetic separation and secondary fine grinding to obtain the iron alloy and the cement material.

Embodiment 1

The dosage of MSWI fly ash was 35 wt %, and the dosage of red mud was 65 wt %; the MSWI fly ash and the red mud were uniformly mixed according to this proportion and then were placed into a crucible, and the crucible was put into a muffle furnace to carry out reduction roasting for 90 min at 1200° C.; The crucible was then removed from the muffle furnace and allowed to cool naturally, and the mass fraction having a fineness of −0.043 mm in a primary grinding product was 71.32%; the obtained product was subjected to magnetic separation under a condition where the magnetic field intensity was 1.8 kGs, so that iron alloy having an iron grade of 92.56% and an iron recycling rate of 83.22% and containing a trace amount of Ni, Cu, Cr and other siderophile metals may be obtained; and a nonmagnetic cement material was subjected to secondary fine grinding to obtain a cement material of which the mass fraction having the fineness of −0.043 mm was 97.36% and the specific surface area was 480 m²/kg, where a main phase of the cement material was glass phase and tricalcium silicate, and the 28-day compressive strength was 78 Mpa by taking water glass and sodium hydroxide as an alkali activator.

In this embodiment, main chemical components of the MSWI fly ash were as follows, and because of a trace amount of foreign matters in the fly ash, a sum of the following chemical components in the fly ash was smaller than 100%: 42.26% of CaO, 11.2% of C, 19.61% of Cl, 4.53% of $SiO_2$, 3.78% of $SO_3$, 2.87% of MgO, 1.68% of $Al_2O_3$, 2.89% of $Fe_2O_3$, 5.17% of $K_2O$, 3.18% of $Na_2O$, 0.85% of ZnO, 0.43% of $TiO_2$, 0.39% of $P_2O_5$, 0.17% of PbO, 0.05% of CuO, 0.07% of NiO, 0.04% of $Cr_2O_3$, 0.03% of SrO, 0.11% of MnO and 0.001% of Hg.

The red mud component was Bayer process red mud, main chemical components in the red mud were 39.15% of $Fe_2O_3$, 20.81% of $Al_2O_3$, 18.91% of $SiO_2$, 2.41% of CaO, 0.24% of MgO, 7.69% of $Na_2O$, 0.10% of $K_2O$, 4.51% of $TiO_2$, and the ignition loss was 6.18%.

Embodiment 2

The dosage of MSWI fly ash was 40 wt %, and the dosage of red mud was 60 wt %; the MSWI fly ash and the red mud were uniformly mixed according to the proportion and then were placed into a crucible, and the crucible was put into a muffle furnace to carry out reduction roasting for 60 min at 1250° C.; The crucible was then removed from the muffle furnace and allowed to cool naturally, and the mass fraction having a fineness of −0.043 mm in a primary grinding product was 73.48%; the obtained product was subjected to magnetic separation under a condition where the magnetic field intensity was 1.8 kGs, so that iron alloy having an iron grade of 91.96% and an iron recycling rate of 84.13% and containing a trace amount of Ni, Cu, Cr and other siderophile metals may be obtained; and a nonmagnetic cement material was subjected to secondary fine grinding to obtain a cement material of which the mass fraction having the fineness of −0.043 mm was 94.58% and the specific surface area was 550 m$^2$/kg, where a main phase of the cement material was glass phase and tricalcium silicate, and the 28-day compressive strength was 86 Mpa by taking water glass and sodium hydroxide as an alkali activator.

In this embodiment, main chemical components of the MSWI fly ash were as follows: 40.11% of CaO, 15.87% of C, 18.91% of Cl, 5.31% of $SiO_2$, 2.86% of $SO_3$, 2.37% of MgO, 1.43% of $Al_2O_3$, 4.08% of $Fe_2O_3$, 4.32% of $K_2O$, 2.12% of $Na_2O$, 0.58% of ZnO, 0.40% of $TiO_2$, 0.36% of $P_2O_5$, 0.17% of PbO, 0.05% of CuO, 0.06% of NiO, 0.04% of $Cr_2O_3$, 0.02% of SrO, 0.08% of MnO and 0.001% of Hg.

The red mud component was Bayer process red mud, and main chemical components were as follows:

42.31% of $Fe_2O_3$, 20.33% of $Al_2O_3$, 19.21% of $SiO_2$, 1.79% of CaO, 0.23% of MgO, 8.87% of $Na_2O$, 0.19% of $K_2O$, 2.96% of $TiO_2$, and the ignition loss was 4.11%.

Embodiment 3

The dosage of MSWI fly ash was 34 wt %, the dosage of red mud was 50 wt % and the dosage of an alumina agent was 16 wt %; the MSWI fly ash, the red mud and the alumina agent were uniformly mixed according to this proportion and then were placed into a crucible, and the crucible was put into a muffle furnace to carry out reduction roasting for 90 min at 1350° C.; The crucible was then removed from the muffle furnace and allowed to cool naturally, and the mass fraction having a fineness of −0.043 mm in a primary grinding product was 69.32%; the obtained product was subjected to magnetic separation under a condition where the magnetic field intensity was 1.8 kGs, so that iron alloy having an iron grade of 93.73% and an iron recycling rate of 85.94% and containing a trace amount of Ni, Cu, Cr and other siderophile metals may be obtained; and a nonmagnetic cement material was subjected to secondary fine grinding to obtain a calcium aluminate material product of which the mass fraction having the fineness of −0.043 mm was 92.14%, the specific surface area was 571 m$^2$/kg, the CaO was 29.34%, the $Al_2O_3$ was 51.14% and the main phase was calcium aluminate, where the calcium aluminate product may be used for manufacturing a calcium aluminate cement material.

In this embodiment, main chemical components of the MSWI fly ash were as follows:

43.76% of CaO, 14.13% of C, 15.87% of Cl, 6.60% of $SiO_2$, 4.79% of $SO_3$, 1.68% of MgO, 1.21% of $Al_2O_3$, 2.08% of $Fe_2O_3$, 4.34% of $K_2O$, 2.90% of $Na_2O$, 0.52% of ZnO, 0.38% of $TiO_2$, 0.35% of $P_2O_5$, 0.16% of PbO, 0.08% of CuO, 0.02% of NiO, 0.12% of $Cr_2O_3$, 0.01% of CdO, 0.01% of $Sb_2O_3$, 0.07% of MnO and 0.001% of Hg.

The red mud component was Bayer process red mud, and main chemical components were as follows:

36.86% of $Fe_2O_3$, 26.43% of $Al_2O_3$, 18.50% of $SiO_2$, 2.92% of CaO, 0.44% of MgO, 9.33% of $Na_2O$, 0.37% of $K_2O$, 2.01% of $TiO_2$, and the ignition loss was 3.14%.

The above description of the embodiment is only for helping to understand the method of the present invention and its core idea. It should be noted that, several improvements and modifications may be made by persons of ordinary skill in the art without departing from the principle of the present invention, and these improvements and modifications should also be considered within the protection scope of the present invention. Various modifications to these embodiments are readily apparent to persons skilled in the art, and the generic principles defined herein may be practiced in other embodiments without departing from the spirit or scope of the invention. Thus, the present invention is not limited to the embodiments shown herein but falls within the widest scope consistent with the principles and novel features disclosed herein.

What is claimed is:

1. A method for preparing iron alloy and a cement material, comprising the following steps:
   subjecting a mixture obtained by mixing municipal solid waste incineration (MSWI) fly ash with red mud to reduction roasting to obtain a roasted product; and
   subjecting the roasted product to grinding-magnetic separation to obtain the iron alloy and the cement material;
   wherein the grinding-magnetic separation comprises primary grinding, magnetic separation and secondary fine grinding that are carried out sequentially; and
   the iron alloy is obtained after the primary grinding and magnetic separation, and the cement material is obtained after the primary grinding, magnetic separation, and secondary fine grinding.

2. The preparation method according to claim 1, wherein the mass percentage of the MSWI fly ash in the mixture is 30-70%, and the mass percentage of the red mud is 30-70%.

3. The preparation method according to claim 1, wherein the mixture further comprises an aluminum-containing additive, and the mass percentage of the aluminum-containing additive in the mixture is 0-30%.

4. The preparation method according to claim 3, wherein the aluminum-containing additive comprises one or more of aluminum oxide, aluminum powder, aluminum slag and aluminum ash.

5. The preparation method according to claim 1, wherein the MSWI fly ash comprises the following components by mass percentage: 10-70% of CaO, 5-20% of C, 0.1-10% of $SiO_2$, 0.1-10% of $Al_2O_3$, 0.1-30% of Cl, 0.1-10% of $Na_2O$, 0.1-10% of $K_2O$, 0.1-10% of MgO, 0.1-10% of $SO_3$, 0.1-10% of $Fe_2O_3$, 0-10% of $TiO_2$ and 0-10% of $P_2O_5$.

6. The preparation method according to claim 5, wherein the MSWI fly ash further comprises the following components by mass percentage: 0-1% of ZnO, 0-1% of PbO, 0-1% of $Cr_2O_3$, 0-1% of CuO, 0-1% of MnO, 0-1% of NiO, 0-1% of BaO, 0-1% of SrO, 0-1% of CdO and 0-1% of Hg.

7. The preparation method according to claim 1, wherein the red mud comprises the following components by mass percentage: 30-50% of $Fe_2O_3$, 10-30% of $Al_2O_3$, 15-50% of $SiO_2$, 0.1-10% of CaO, 0.1-5% of MgO, 1-10% of $Na_2O$, 0.1-0.5% of $K_2O$, and 0.5-10% of $TiO_2$; and the ignition loss is 1-15%.

8. The preparation method according to claim 1, wherein the temperature for the reduction roasting is 1100-1350° C., and the time for the reduction roasting is 30-90 min.

9. The preparation method according to claim 1, wherein the mass fraction having a fineness of −0.043 mm in the primary grinding product is 50-80%; the mass fraction having the fineness of −0.043 mm is 90-100% and the specific surface area is 350-600 m$^2$/kg in the secondary fine grinding product.

10. The preparation method according to claim 1, wherein the magnetic field intensity in the magnetic separation is 1.8-2.0 kGs.

11. The preparation method according to claim 2, wherein the mixture further comprises an aluminum-containing additive, and the mass percentage of the aluminum-containing additive in the mixture is 0-30%.

12. The preparation method according to claim 11, wherein the aluminum-containing additive comprises one or more of aluminum oxide, aluminum powder, aluminum slag and aluminum ash.

13. The preparation method according to claim 2, wherein the MSWI fly ash comprises the following components by mass percentage: 10-70% of CaO, 5-20% of C, 0.1-10% of $SiO_2$, 0.1-10% of $Al_2O_3$, 0.1-30% of Cl, 0.1-10% of $Na_2O$, 0.1-10% of $K_2O$, 0.1-10% of MgO, 0.1-10% of $SO_3$, 0.1-10% of $Fe_2O_3$, 0-10% of $TiO_2$ and 0-10% of $P_2O_5$.

14. The preparation method according to claim 13, wherein the MSWI fly ash further comprises the following components by mass percentage: 0-1% of ZnO, 0-1% of PbO, 0-1% of $Cr_2O_3$, 0-1% of CuO, 0-1% of MnO, 0-1% of NiO, 0-1% of BaO, 0-1% of SrO, 0-1% of CdO and 0-1% of Hg.

15. The preparation method according to claim 2, wherein the red mud comprises the following components by mass percentage: 30-50% of $Fe_2O_3$, 10-30% of $Al_2O_3$, 15-50% of $SiO_2$, 0.1-10% of CaO, 0.1-5% of MgO, 1-10% of $Na_2O$, 0.1-0.5% of $K_2O$, and 0.5-10% of $TiO_2$, and the ignition loss is 1-15%.

\* \* \* \* \*